US008112340B2

(12) United States Patent
Watson et al.

(10) Patent No.: US 8,112,340 B2
(45) Date of Patent: Feb. 7, 2012

(54) COLLATERALIZED DEBT OBLIGATION EVALUATION SYSTEM AND METHOD

(75) Inventors: Robert C. Watson, Port Washington, NY (US); Kai Gilkes, London (GB); Norbert Jobst, Edenbridge (GB); Sriram Rajan, Brooklyn, NY (US)

(73) Assignee: Standard & Poor's Financial Services LLC, New York, NY (US)

( * ) Notice: Subject to any disclaimer, the term of this patent is extended or adjusted under 35 U.S.C. 154(b) by 1025 days.

(21) Appl. No.: 11/747,634

(22) Filed: May 11, 2007
(Under 37 CFR 1.47)

(65) Prior Publication Data
US 2008/0133427 A1    Jun. 5, 2008

Related U.S. Application Data

(60) Provisional application No. 60/799,640, filed on May 12, 2006.

(51) Int. Cl.
G06Q 40/00    (2006.01)
(52) U.S. Cl. .......................................... 705/36 R; 705/38
(58) Field of Classification Search ................ 705/36 R, 705/35, 37, 38; 235/379, 380
See application file for complete search history.

(56) References Cited

U.S. PATENT DOCUMENTS

| 6,654,727 | B2 * | 11/2003 | Tilton | 705/36 R |
|---|---|---|---|---|
| 7,739,171 | B2 * | 6/2010 | Tilton | 705/36 R |
| 2003/0101120 | A1 * | 5/2003 | Tilton | 705/36 |
| 2004/0098329 | A1 * | 5/2004 | Tilton | 705/36 |
| 2005/0044029 | A1 * | 2/2005 | Griffin et al. | 705/36 |
| 2005/0144119 | A1 | 6/2005 | Monsen et al. | |
| 2005/0273429 | A1 | 12/2005 | Deckoff | |
| 2006/0224491 | A1 * | 10/2006 | Pinkava | 705/37 |
| 2006/0224492 | A1 * | 10/2006 | Pinkava | 705/37 |
| 2006/0224493 | A1 * | 10/2006 | Pinkava | 705/37 |
| 2006/0224494 | A1 * | 10/2006 | Pinkava | 705/37 |

FOREIGN PATENT DOCUMENTS
WO    WO 2007133685 A2 * 11/2007

OTHER PUBLICATIONS

Bergman, Sten "CDO Evaluator and Portfolio Benchmarks"2002 Securitization Conduit v5n1-4 pp. 38-51.*
Khakee et al. "CDO Transactions Structural Basics"2002 Securitization Conduit v5n1-4 pp. 18-37.*
Anonymous "Fitch Affirms All Classes of Trainer Wortham First Republic CBO III, Ltd." Sep. 26, 2005 Business Wire , NA.*
Anonymous "Fitch Affirms North Street Referenced Linked Notes 2000-2, Ltd." Nov. 10, 2005 Business Wire , NA.*

(Continued)

*Primary Examiner* — Kelly Campen
(74) *Attorney, Agent, or Firm* — Rothwell, Figg, Ernst & Manbeck, P.C.

(57) ABSTRACT

A computerized system and method for evaluating collateralized debt obligations receives user input selecting a scenario or feature, loads data related to a portfolio of securitized assets on to the computer storage medium, determines a scenario default rate using at least one of a beta distributed recovery, a counterparty risk, a loss given default, or a non-zero inter-sector correlation, or models at least one of a short position scenario, a $n^{th}$ to default basket, a forward start date and an equity default swap, and reports a result relating to the scenario default rate.

31 Claims, 8 Drawing Sheets

OTHER PUBLICATIONS

Anonymous "Fitch Affirms 3 & Lowers 4 Classes of E*TRADE ABS CDO I." Mar. 7, 2006 Business Wire, NA.*

International Search Report issued in PCT/US2007/11412 on Dec. 7, 2007, 2 pp.

CDO Evaluator Handbook Version 3.0 by Standard & Poor's Structured Finance Group, Feb. 2006, 87 pp.

De Servigny et al., "An Empirical Analysis of Equity Default Swaps (I): Univariate Insights", Risk, Apr. 1, 2005, pp. 1-36.

CDO Evaluator Version 3.0: Technical Document, Standard & Poor's, Structured Finance, Dec. 19, 2005, pp. 1-22.

S&P Launches Latest Version of CDO Evaluator Modeling Tool, Standard & Poor's, Structured Finance, Dec. 19, 2005, 2 pp.

* cited by examiner

| | A | B | C | D | E | F | G | H | I | J |
|---|---|---|---|---|---|---|---|---|---|---|
| | \|Deal Type \| Scenario Loss Rates ▼ \| Rated OC ▼ \| Utilities ▼ \| Data Transfer ▼ \| Language ▼ \| HELP ▼ \|Simulation Options\| | | | | | | | | | |
| | *The McGraw-Hill Companies* | | | | | | | | | |
| | STANDARD &POORS | CDO Evaluator 3.0 | | | | | | | | |
| 1 | | | | | | | | | | |
| 2 | Transaction Name | | | | | | | | | |
| 3 | As of Date | | | | | | | | | |
| 4 | Total Balance | | 0 | | | | | | | |
| 5 | ● Use Portfolio WAM for Tranche Maturity<br>○ Enter Tranche Maturity Date | | | | | | ● Calculate SDRs<br>○ Calculate SLRs | | | |
| 6 | Obligor ID | Asset Type | S&P Credit Rating | Weighted Average Maturity | Current Balance | Current Coupon (annualized) | Lookup Recovery Rates Assumed Recovery (%) | Assumed Recovery Standard Deviation | Scenario | Current Market Price (Per 100 Face) |
| 7 | | | | | | | | | | |
| 8 | | | | | | | | | | |
| ... | | | | | | | | | | |
| 32 | | | | | | | | | | |

\| ▶ ▶\| Assets ⟨ Assets (Key Statistics) ⟨ SLR ⟨ ROC ⟨ ROC Hedge ⟨ SROC ⟨ Recovery Assumption ⟨ Correlation Assumption ⟨ D ▼\|

Ready

*Assets spreadsheet, empty portfolio, partial view*

Figure 3

*Deal type window*

■ = FIELD IS PRESENT

| | | DEAL TYPE OPTIONS | | | | | | |
|---|---|---|---|---|---|---|---|---|
| SPREADSHEET | DATA FIELD NAME | STANDARD CDO (No options selected) | CDO SQUARED OR CDO² TRANSACTION | CROSS SUBORDINATION TRANSACTION | MODEL COUNTER-PARTY RISK | CONTAINS SHORT POSITIONS | CONTAINS EQUITY DEFAULT SWAPS | CONTAINS FORWARD START ASSETS |
| ASSETS | Obligor ID | ■ | ■ | ■ | ■ | ■ | ■ | ■ |
| | Asset Type | ■ | ■ | ■ | ■ | ■ | ■ | ■ |
| | S&P Credit Rating | ■ | ■ | ■ | ■ | ■ | ■ | ■ |
| | Weighted Average Maturity | ■ | ■ | ■ | ■ | ■ | ■ | ■ |
| | Forward Start Date | | | | | | | ■ |
| | Current Balance | ■ | ■ | ■ | ■ | ■ | ■ | ■ |
| | Long/Short | | | | | ■ | | |
| | Current Coupon | ■ | ■ | ■ | ■ | ■ | ■ | ■ |
| | Assumed Recovery (%) | ■ | ■ | ■ | ■ | ■ | ■ | ■ |
| | Assumed Recov. Stand. Dev | ■ | ■ | ■ | ■ | ■ | ■ | ■ |
| | Seniority | ■ | ■ | ■ | ■ | ■ | ■ | ■ |
| | Current Market Price | ■ | ■ | ■ | ■ | ■ | ■ | ■ |
| | Country Code | ■ | ■ | ■ | ■ | ■ | ■ | ■ |
| | Sovereign For. Cur. Rating | ■ | ■ | ■ | ■ | ■ | ■ | ■ |
| | CDS Counterparty ID | | | | ■ | ■ | | |
| | Financial Guarantor ID | | | | ■ | ■ | | |
| | EDS Score | | | | | | ■ | |
| | EDS Barrier (price) | | | | | | ■ | |
| | Stock Price | | | | | | ■ | |
| | EDS Barrier (%) | | | | | | ■ | |
| | Country Name | ■ | ■ | ■ | ■ | ■ | ■ | ■ |
| | Region Code | ■ | ■ | ■ | ■ | ■ | ■ | ■ |
| | Industry | ■ | ■ | ■ | ■ | ■ | ■ | ■ |
| | Description | ■ | ■ | ■ | ■ | ■ | ■ | ■ |
| | Cross Subordination ID | | | ■ | | | | |
| | CDO ID | | ■ | ■ | | | | |
| CDO of CDO | CDO ID | | ■ | ■ | | | | |
| | CDO Name | | ■ | ■ | | | | |
| | Percent Owned | | ■ | ■ | | | | |
| | Attachment Point | | ■ | ■ | | | | |
| | Detachment Point | | ■ | ■ | | | | |
| | Cross Subordination ID | | | ■ | | | | |
| | Cross Subord. Percentage | | | ■ | | | | |
| | Parent CDO ID | | ■ | ■ | | | | |
| | Calculated Attachment Rating | | ■ | ■ | | | | |
| | Calculate Individual SDR? | | ■ | ■ | | | | |
| COUNTERPARTY | Counterparty ID | | | | ■ | ■ | | |
| | Asset Type | | | | ■ | ■ | | |
| | S&P Credit Rating | | | | ■ | ■ | | |
| | Country Code | | | | ■ | ■ | | |
| | Sovereign For. Cur. Rating | | | | ■ | ■ | | |

Figure 5

*Assets (Key Statistics) spreadsheet, displayed in Japanese*

COLLATERALIZED DEBT OBLIGATION EVALUATION SYSTEM AND METHOD

CROSS REFERENCE TO RELATED APPLICATION

This application claims the benefit of U.S. Provisional Application No. 60/799,640, filed May 12, 2006, which is incorporated herein by reference.

BACKGROUND OF THE INVENTION

1. Technical Field

The present invention relates to a system and method for evaluating collateralized debt obligations. More particularly, the present invention relates to a system and method of modeling scenario default or loss rates for evaluation of collateralized debt obligation transactions.

2. Description of the Background Art

The goal of structured finance is to allow lenders to make loans and structure the deals to free themselves from concerns over the creditworthiness of the borrower. One approach is the collateralized debt obligation, sometimes known as a CDO. Collateralized debt obligations are financial instruments that transfer the risk associated with a portfolio of assets to one or more investors. A cash collateralized debt obligation is a simple example. A special purpose entity is created, and various physical assets are transferred to it. These assets may include corporate or sovereign bonds, asset or mortgage backed securities or loans. Investors can then buy shares in the special purpose entity, providing them with return based on the performance of the basket of assets.

The advent of credit derivatives technology has made collateralized debt obligations more powerful. Whereas the special purpose entity in the cash collateralized debt obligation owns the physical assets, a synthetic collateralized debt obligation allows the special purpose entity to instead write credit default swap contracts. Generally, a credit default swap is an agreement between a buyer and seller. The buyer makes periodic payments to the seller. In return, if the referenced asset defaults, the seller makes a contingency payment to the buyer. The special purpose entity in a synthetic collateralized debt obligation may enter into dozens or hundreds of such credit default swap contracts.

Investors may be able to purchase shares of collateralized debt obligation tranches. Each tranche is a slice of the collateralized debt obligation's liability structure, and is paid off from the most senior to the most subordinate. For example, consider a collateralized debt obligation with ten tranches, each covering one tenth of the collateralized debt obligation. If the collateralized debt obligation loses 25% of its value, the seven most senior tranches will be completely paid. The eighth tranche will receive the remainder, 50% of what they could have earned, and the last two tranches will receive nothing. Each tranche is liable for losses above its attachment point, but not liable for losses above its detachment point. The collateralized debt obligation sustained losses that were above the detachment point of the two most subordinate tranches, so they received nothing, but were not liable for more than their share. The loss was halfway between the eighth tranche's attachment and detachment points, so it lost half of its potential value.

Synthetic collateralized debt obligation squared transactions enjoy more leverage than similarly rated synthetic collateralized debt obligations. A collateralized debt obligation squared is a collateralized debt obligation of collateralized debt obligations. The referenced collateralized debt obligations are bespoke, meaning that only one tranche is sold (other tranches may be held onto by a dealer). The collateralized debt obligation squared may reference 5-15 bespoke collateralized debt obligations, each of which references between 100 and 200 corporate names. The collateralized debt obligation squared is referred to as the parent collateralized debt obligation and the referenced collateralized debt obligations are referred to as underlying, or inner collateralized debt obligations. Many corporate names will be referenced by multiple bespoke collateralized debt obligations, often with 20-30% overlap between the bespoke collateralized debt obligations. The collateralized debt obligation squared may reference asset backed securities and other physical assets along with the bespoke collateralized debt obligations.

Structured finance continues to drive innovations in collateralized debt obligation technology. One example is the $n^{th}$ to default basket. Instead of writing a credit default swap where the seller pays the buyer when a single entity defaults, the $n^{th}$ to default basket is where the credit default swap references a number of entities (typically three to five), and the seller only has to pay the buyer once N entities have defaulted.

Prior CDO evaluation tools did not have the capability of rating these and other types of complex CDO transactions. Also, the accuracy of prior CDO evaluation tools suffered because of their assumption of a fixed recovery.

Thus, there is a need in the art for a system that can evaluate and model complex CDO transactions, including, but not limited to, equity default swaps (EDS), transactions involving assets with counterparty risk or forward start date, transactions in which assets are sold short, and transactions mixing corporate and small to medium-enterprise (SME) assets, etc. There is also a need for a tool that can more accurately assess the risk associated with CDO transactions.

SUMMARY OF THE INVENTION

In a first aspect of the present invention, a computerized system and method receives user input selecting an equity default swap scenario, loads data related to a portfolio of securitized assets into a workspace, receives user input designating an equity default swap price barrier for an asset, retrieves an equity default swap score for the asset based on user input, determines a scenario default rate for an equity default swap using the equity default swap price barrier and equity default swap score, and reports a result relating to the scenario default rate to the user.

In a second aspect of the present invention, a computerized system and method receives user input selecting a scenario from a user input device, and loads data related to a portfolio of securitized assets on to a computer storage medium. The computerized system and method models at least one of a short position scenario, an $n^{th}$ to default basket scenario, and a forward start date scenario, based on the user input and at least one of the assets in the portfolio. In the second aspect, the computerized system and method also determines a scenario default rate based on the scenario modeled, and reports a result relating to the scenario default rate to the user.

In a third aspect of the present invention, a computerized system and method receives user input selecting one or more scenario features for modeling a scenario default rate from a user input device, and loads data related to a portfolio of securitized assets on to a computer storage medium based on the user input. The scenario features include at least one of a beta distributed recovery, a counterparty risk, a loss given default, and a non-zero inter-sector correlation. In the third aspect, the computerized system and method also determines a scenario default rate using the one or more user selected scenario features, and reports a result relating to the scenario default rate.

Some of the advantages of the present invention are that, depending upon how it is embodied, the system and method can provide consistent rating criteria, can simplify integration with other models and platforms (plug and play compatibility), can minimize model maintenance, and/or keep ratings criteria changes in a single place. The present invention also makes possible the combination of multiple global requirements into a single model.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

FIG. 3 is an image of a workspace generated by a CDO evaluation system according to the present invention.

FIG. 5 is a table matching deal types with data fields for evaluating CDOs according to the present invention.

DETAILED DESCRIPTION OF THE PREFERRED EMBODIMENTS

Figure 1:
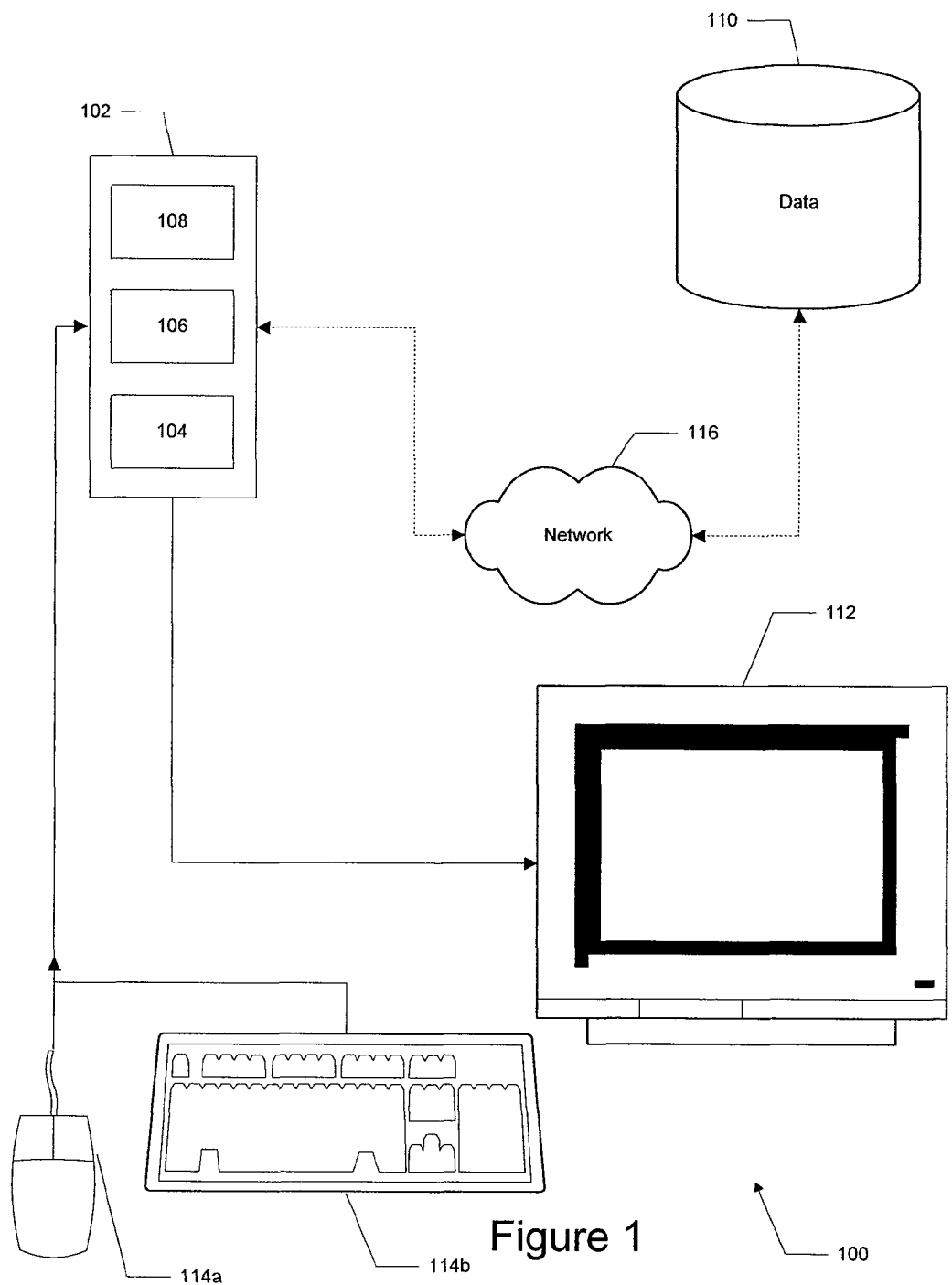
FIG. 1 is a schematic diagram of a CDO evaluation system according to the present invention.

FIG. 1 illustrates a preferred embodiment of a computerized system 100 for evaluating collateralized debt obligations ("CDOs"). The system 100 includes a computer 102 with a processor 104, memory 106 and persistent storage 108 storing one or more sets of instructions, or program modules, executable by the computer system to allow a user to load, view and edit portfolios of CDOs and model various CDO transactions, also known as scenarios. The system 100 also includes a display device 112 coupled to the processor 104 to present graphical or audio displays to allow a user to monitor system outputs, such as results. The system also has one or more user input devices 114, such as a mouse 114a or a keyboard 114b.

Computer 102 is preferably a standard desktop computer, but can be any type of computer known to those of skill in the art, including without limitation a handheld computer, a server, a laptop or a plurality of networked computers. The computer 102 can have one processor 104 or multiple processors, and a given processor can have multiple cores.

Memory 106 is preferably random access memory, but can be any type of volatile memory device. Storage 108 is preferably an internal hard disk drive but can be any kind of persistent storage device, including without limitation an external hard disk drive, an optical disk drive or a memory stick. The computer storage medium may be coupled to the processor by any method known to those of skill in the art, such as a SCSI or IDE connection or via a network 116, such as the internet, a wide area network (WAN) or a local area network (LAN).

Display device 112 is coupled to the processor 104 to present user interface elements and report various results to a user. The display device 112 can be any type of standard display, including without limitation a cathode ray tube (CRT) display, an LED display, or an LCD display. In some instances, the display device 112 may be remote from the processor 104, potentially across a local area network (LAN), wide area network (WAN) or the internet. In some instances, a processor 104 may be coupled to multiple display devices 112.

A user may send input to processor 104 in a number of ways, e.g., by using an input device 114 such as mouse 114a and/or keyboard 114b, although any of the input devices known to those of skill in the art may be used. User input may be provided in response to a message box, prompt, drop down field, checkbox, radio button, text box, button, menu option, toolbar, or other user interface element. Processor 104 may receive user input in a standard manner, such as by processing a system interrupt, checking a system variable or other electronic communication.

The program module that allows the user to model CDO transactions is referred to herein as the CDO Evaluator Engine and includes various algorithms, embodied as routines and subroutines, that can access data stored on the computer hard drive 108 (or data stored on another computer hard drive via an optional network 116) to provide information such as risk of default. For a given portfolio, the CDO Evaluator Engine may set various scenario parameters according to user input, receive further user input to select a type of transaction and proceed to model the selected transaction according to the requested parameters. The CDO Evaluator Engine can then compute different results such as a scenario loss rate.

There are different ways that a user may install software related to an embodiment of the invention. A user may visit a website, such as http://www.cdointerface.com, and request to download a copy. This user may need to register to receive a password before they can download the software. Registering allows the distributor of the software to accept or deny requests for the software. The need for a password may be enforced by disallowing access to a webpage or by encrypting the downloaded software. A password may be provided by a user or by authentication hardware such as a hardware dongle or a biometric sensor. The downloaded file may be compressed, such as with the ZIP file format, or uncompressed.

Figure 2:
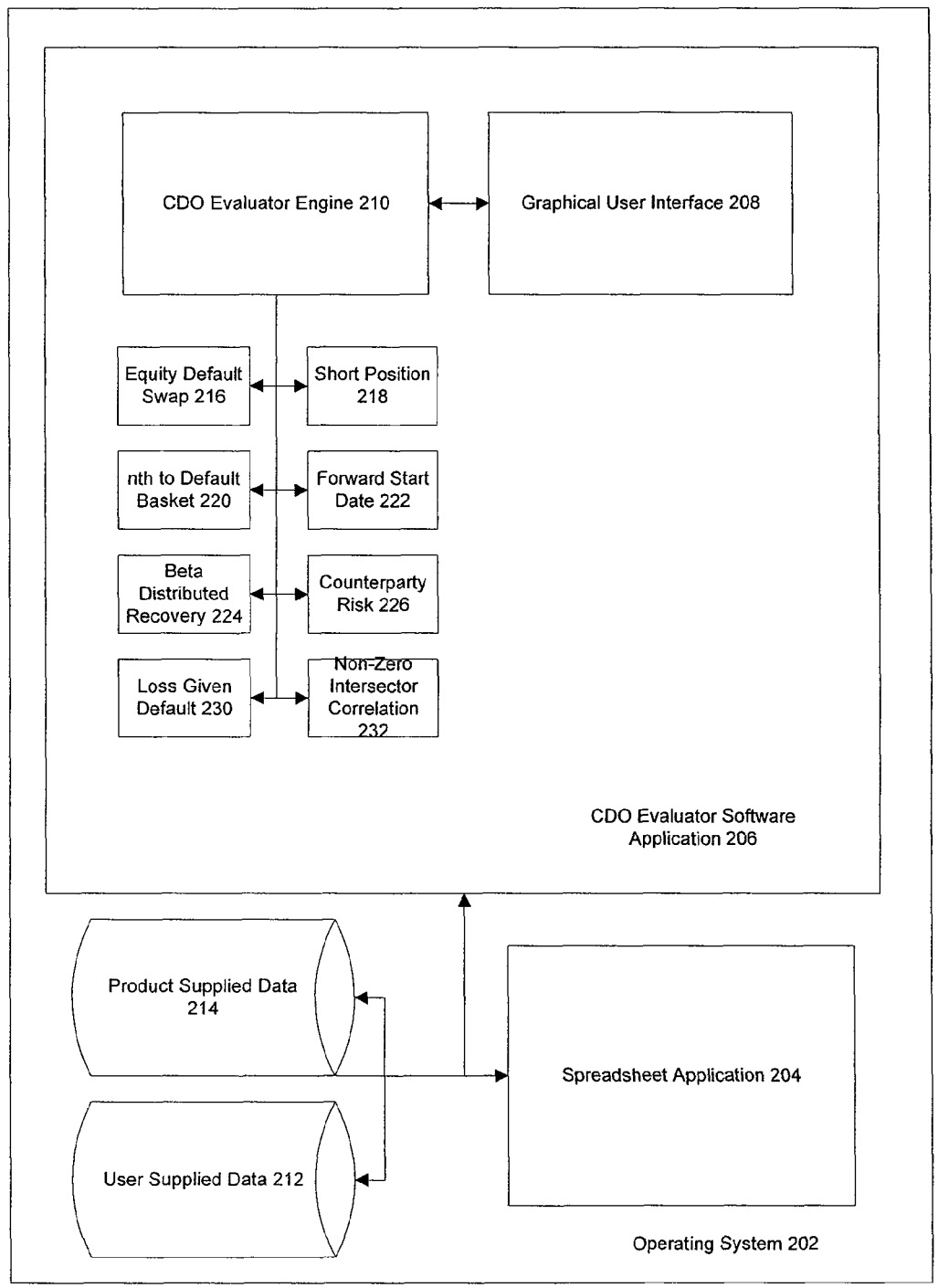
FIG. 2 is a schematic diagram of software components of a CDO evaluation system according to the present invention.

FIG. 2 illustrates an embodiment of a computer software system 206 for evaluating CDOs according to the present invention. The computer software system 206 is designed to run on a standard operating system 202, such as Microsoft Windows that manages the hardware and software resources of computer 102. A spreadsheet application 204, such as Microsoft Excel, runs on the operating system 202, and the CDO Evaluator software system 206 is configured to interface with the spreadsheet application 204. In the embodiment shown, the CDO Evaluator software application 206 includes two modules, the Graphical User Interface 208 and the CDO Evaluator Engine 210. Generally, the Graphical User Interface 208 receives user input and provides it to the CDO Evaluator Engine 210. Examples include scenario selections, scenario descriptions and scenario parameters. After the CDO Evaluator Engine 210 has determined a scenario default rate, or performed some other requested computation, the Graphical User Interface 208 receives the results and reports them to a user via display device 112. The Graphical User Interface 208 may present the results in various ways known to those skilled in the art, such as by populating them into a spreadsheet or by graphing. In operation, the CDO Evaluator Engine 210 receives User Supplied Data 212 and Product Supplied Data 214. The User Supplied Data 212 includes information about a user's portfolio of assets. The term portfolio refers to all of the holdings of a given investor, though it can also refer to assets which have been grouped, e.g. if the owner wants to analyze or trade assets as one unit, or if the assets are all part of a collateralized debt obligation. With this embodiment, the user may request a portfolio via the Graphical User Interface 208, and the CDO Evaluator Engine 210 can load the portfolio without requiring the user to re-enter all of the data. The Product Supplied Data 214 may also contain information such as default tables, credit curves, recovery assumptions, correlation assumptions and sample portfolios. The CDO Evaluator Engine 210 may use these data to model selected scenarios on the portfolio that the user has requested to load. Additionally, the CDO Evaluator Engine 210 may have a host of modules to perform specialized analyses, such as modules for analyzing an Equity Default Swap 216, a Short Position 218, an $n^{th}$ to Default Basket 220, a Forward Start Date 222, a Beta Distributed Recovery 224, Counterparty Risk 226, Loss Given Default 230 and Non-Zero Intersector Correlation 232.

FIG. 3 is a screen shot of a workspace 300 generated by the GUI module 208 according to one embodiment of the invention. The workspace 300 includes one or more spreadsheets 304. Users can view any of the spreadsheets 304 by clicking on the tabs that run along the base of the workspace 300. Along the top of workspace 300 is a toolbar 302 with various options. A user may click on the "Deal Type" option to select the types of deals or transactions they wish to evaluate. The "Scenario Loss Rates" option initiates the scenario default rate/scenario loss rate analysis of the portfolio. The "Data Transfer" option allows users to save only the current CDO asset and analysis data, thereby saving significant amounts of storage space over Excel's File/Save command. "Data Transfer" also allows a user to import data that they have previously saved. The "Language" option allows a user to select English or a foreign language such as Japanese. As soon as a user selects one of the languages, the spreadsheet is displayed with the selected language. The "Simulation Options" option allows a user to use checkboxes to select various outputs such as a Time to Default Table, Unsorted Default Distribution File, Default Distribution Table, SDR Convergence Graph and Obligor Correlation Matrix File.

Figure 4:
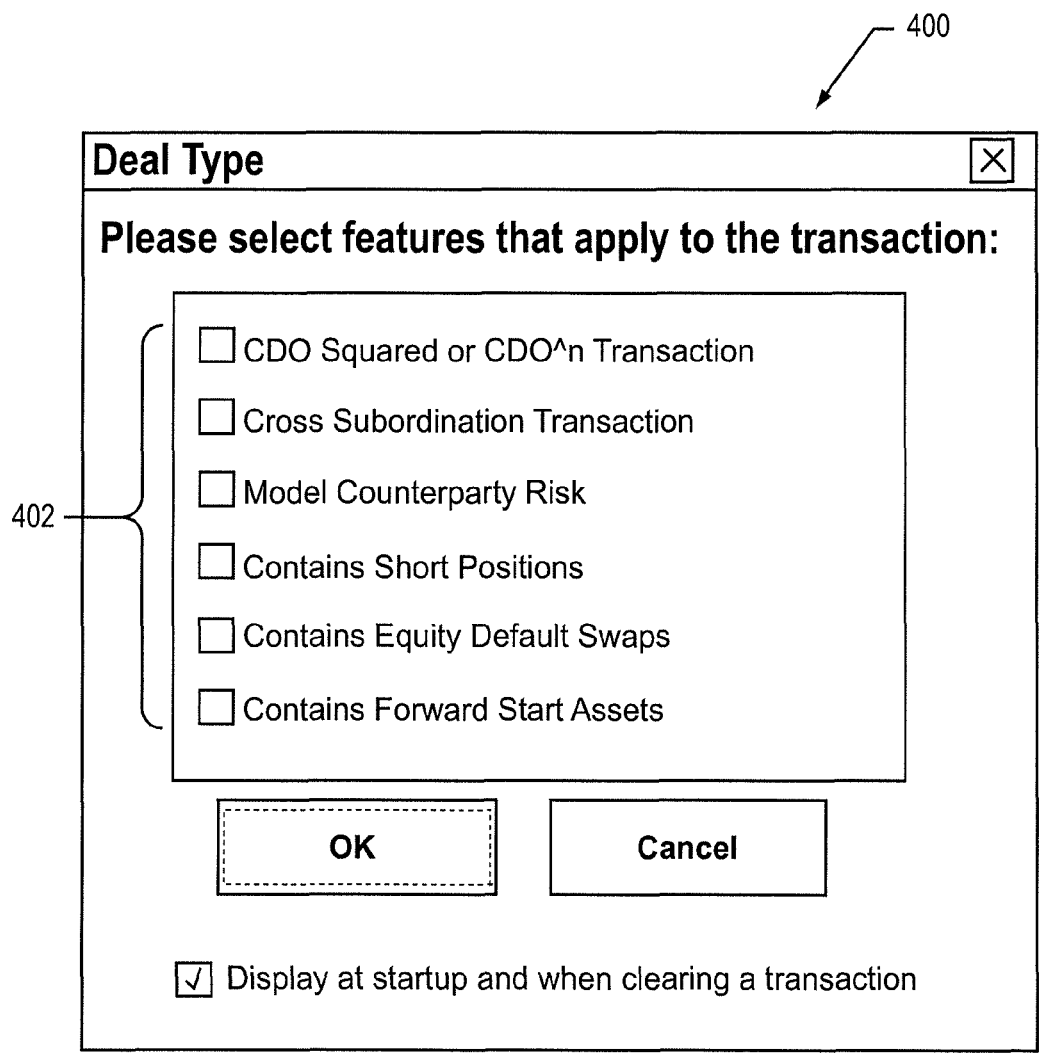
FIG. 4 is an image of a deal type window generated by a CDO evaluation system according to the present invention.

FIG. 4 illustrates a Deal Type window 400 that is displayed by the system when a user selects the deal type option on tool bar 302. A user may use checkboxes 402 to select the type of transaction they wish to model. The deal types that can be modeled include "CDO Squared or CDO^n Transaction," "Cross Subordination Transaction," "Model Counterparty Risk," "Contains Short Positions," "Contains Equity Default Swaps," and "Contains Forward Start Assets." Once a user has selected the deal type, the software system will configure the spreadsheets to display only those fields which are relevant to the type of transaction selected.

FIG. 5 illustrates a table matching deal types with data fields, according to one embodiment of the invention. In this embodiment, a user may be prompted to input data related to the deal type that the user has selected. For example, the user may input this data into a spreadsheet 304 in which each row is a separate asset in a portfolio. The columns in the spreadsheet application 304 correspond to the relevant data fields. Some fields may be blank because the field is not applicable to the asset.

The Obligor Identifier field represents the use defined name of the party obligated to repay the debt.

The Asset Type field identifies the type of asset, e.g. SOV for a sovereign bond.

The S&P Credit Rating field is a rating such as "AA" or "BBB−," which represents the credit worthiness of the asset.

The Weighted Average Maturity field is the date on which the asset matures. The date is the average of the maturity dates of each asset weighted by the value of the asset.

Certain assets may have a Forward Start Date field, which, in this case, is a date (often in the future) after which the default of the asset is included in the scenario default rate/scenario loss rate calculation.

The Current Balance field is the face value amount of the asset.

The Long/Short field denotes if the owner of the asset is a protection seller (i.e., a long position) or a protection buyer (i.e., a short position).

The Current Coupon field is the coupon rate, or coupon yield, of the cash bond.

The Assumed Recovery field is the percentage recovery rate expected in a scenario loss rate analysis.

The Assumed Recovery Standard Deviation field is the standard deviation of the assumed recovery.

The Seniority field may be expressed as '1' for senior secured, '2' for senior unsecured or '3' for subordinate rankings.

The Current Market Price field is the price of the asset, and may be entered in the currency of a collateralized debt obligation per 100 units of the current principal balance of an asset.

The Country Code field specifies the obligor's country of origin. Generally, the country is where the firm's operating headquarters are located, or the predominant country of origin for the collateral in an asset backed security transaction.

The Sovereign Foreign Currency Rating field is Standard & Poor's rating for an obligor's country.

The Credit Default Swap Counterparty Identifier field identifies the counterparty to a credit default swap.

The Financial Guarantor Identifier field specifies the guarantor of the asset.

The Equity Default Swap Score field is a credit quality indicator from 1 to 5, with 1 being the lowest risk and 5 being the highest risk.

The Equity Default Swap Barrier (price) field is the price at which the Equity Default Swap triggers, and is analogous to a default in a credit default swap.

The Stock Price field is the price of one share of the stock.

The Equity Default Swap Barrier (%) field is the percentage indication of the default barrier, and is calculated as the equity default swap barrier price divided by the stock price.

The Country Name field is the name of the country associated with the country code, e.g. '1' is USA.

The Region Code field denotes which region the country, identified by the country code, is in.

The Industry field classifies the asset as in a local, regional or global industry.

The Description field displays a user defined description of the asset.

The Cross Subordination Identifier field is an identifier indicating which assets share subordination with other cross-subordinated collateralized debt obligations.

The Collateralized Debt Obligation Identifier field displays a user defined description of the collateralized debt obligation, which may be useful for a collateralized debt obligation of collateralized debt obligations.

Additional information may be provided for a collateralized debt obligation that references other collateralized debt obligations. This financial structure is also known as a collateralized debt obligation squared. The collateralized debt obligation squared may only reference a tranche of a collateralized debt obligation. For each tranche, the software will display the attachment point and the detachment point. The collateralized debt obligation squared does not suffer losses above the detachment point or below the attachment point. The software may display what percentage of a tranche is owned by the collateralized debt obligation squared, often 100%. Certain referenced collateralized debt obligations may be subordinated by more than one collateralized debt obligation squared. The software then displays a unique identifier for those collateralized debt obligations which share subordination. The software may also display the percentage of subordination that is shared across cross subordinated portfolios. The software may display an identifier for the parent collateralized debt obligation.

Figure 6:
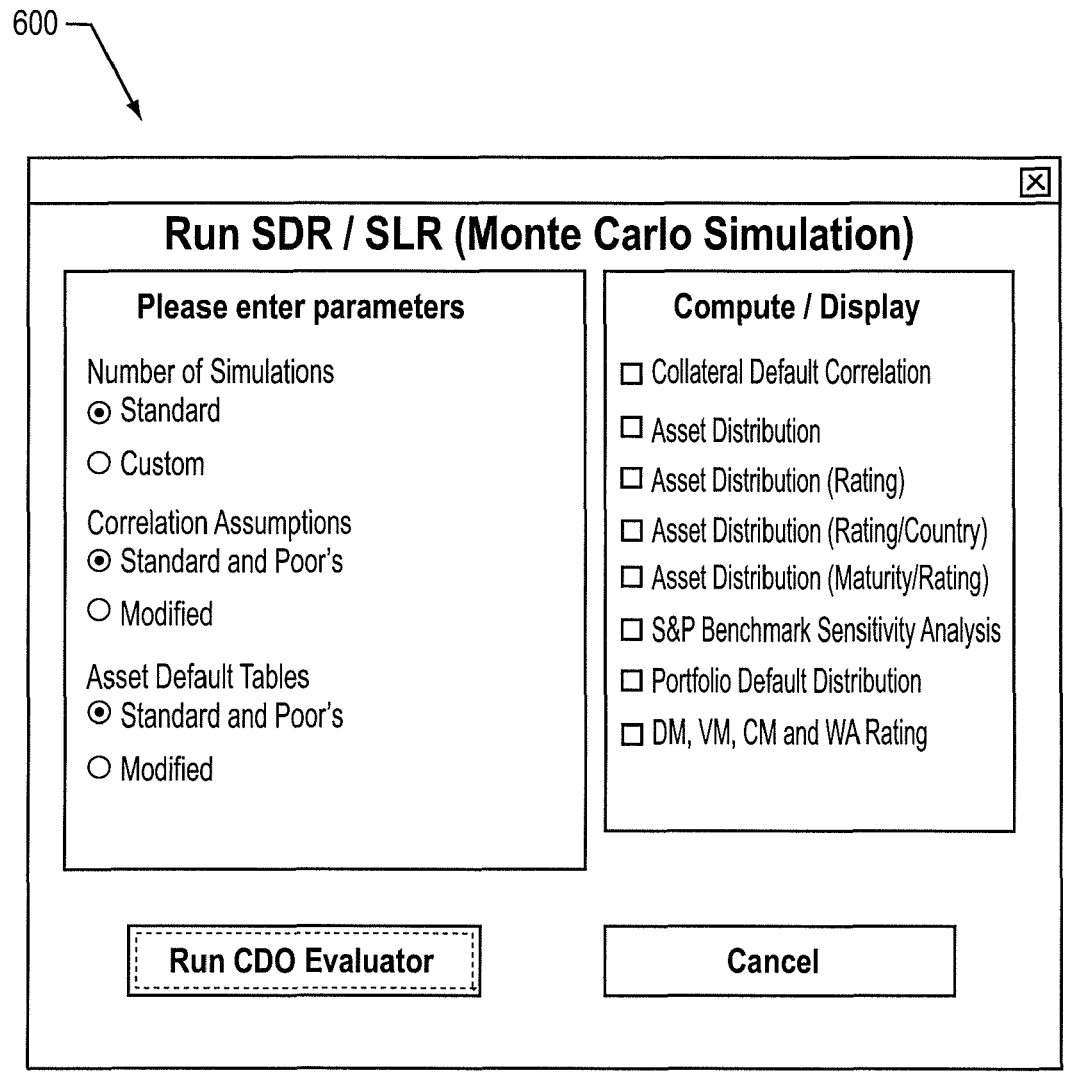
FIG. 6 is an image of a Run SDR/SLR window generated by a CDO evaluation system according to the present invention.
Figure 7:
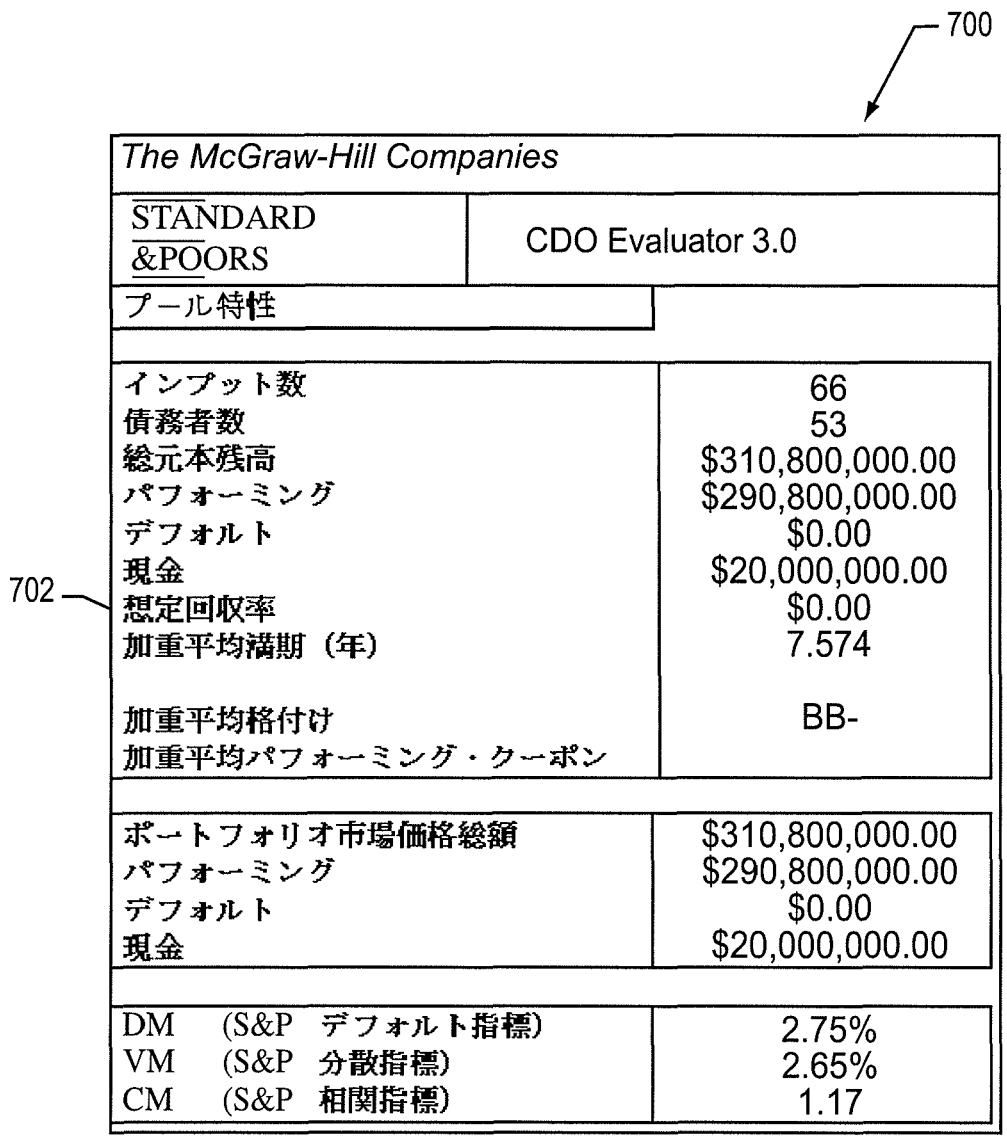
FIG. 7 is an image of a key statistics window from a computer software program for performing CDO evaluation according to the present invention.

FIG. 6 illustrates a Run Scenario Loss Rates/Scenario Default Rates Window 600, which may be generated by the CDO Evaluator system when a user selected the "Scenario Loss Rates" option on the toolbar 302 as depicted in FIG. 3. The window 600 includes checkboxes along one side allowing users to select standard (default) or customized parameters such as the number of Monte Carlo simulations, correlation assumptions, and asset default tables. The window 600 also includes checkboxes along another side allowing users to select compute/display options such as "collateral default correlation," "asset distributions," "asset distribution (rating)" "asset distribution (rating/country)," "asset distributions (maturity/rating)," "S&P benchmark sensitivity analysis," "portfolio default distribution," and "DM, VM, CM and WA rating." A user may view results in spreadsheets, or in an assets (key statistics) spreadsheet 700 as illustrated in FIG. 7. The assets (key statistics) spreadsheet is shown with the Japanese language option selected.

Figure 8:
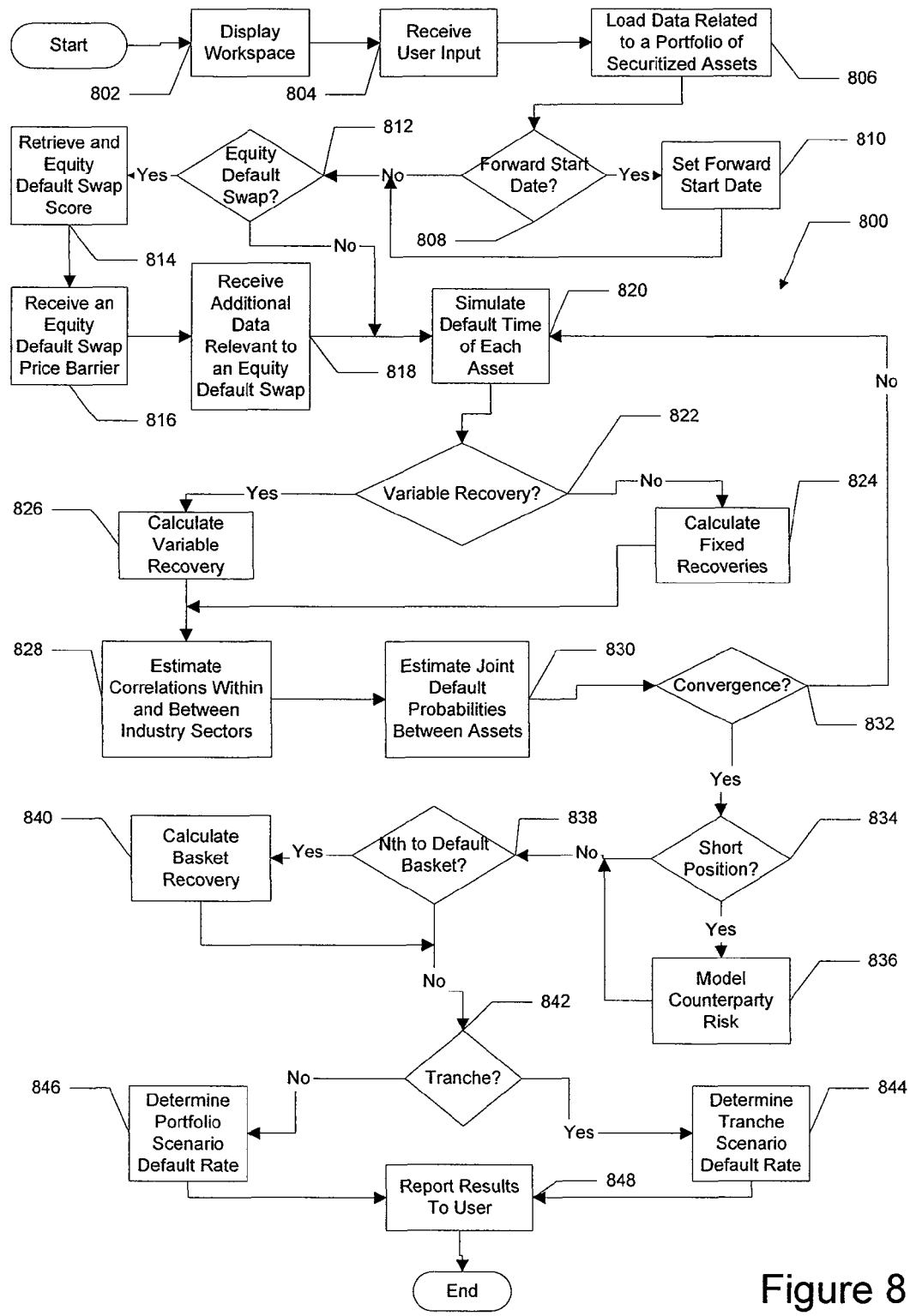
FIG. 8 is a flow chart illustrating a method for evaluating CDOs according to the present invention.

FIG. 8 depicts a flowchart of one embodiment of a computerized method 800 for evaluating collateralized debt obligations according to the present invention. In step 802, the CDO Evaluator system displays a workspace and, if the system is configured to prompt the user for a deal type at startup or when clearing a transaction, a Deal Type window is displayed. In step 804, the system receives user input selecting features that apply to the transaction in the Deal Type window or selecting the import data option from the workspace tool bar if the system does not provide a prompt. In step 806, the system loads data related to a portfolio of securitized assets. If the Deal Type window was displayed in Step 804, the data is entered by the user into fields displayed by the system on the basis of their relevance to the deal type. If the import option was chosen, the system retrieves the data from storage. Next, the portfolio is inspected for forward start dates in step 808. If an asset in the portfolio has a forward start date, the system sets the forward start date in step 810. Assets that do not have a forward start date are treated as starting in the present.

In step 812, the portfolio is inspected for Equity Default Swaps (EDS). An equity default swap is similar to a credit default swap, but instead of linking the equity default swap to a credit event, it is linked to the drop of a of the equity price of the reference entity below a certain barrier, often 30% of the initial price, though other barriers, such as 10% and 20% of the initial price may be used. In the preferred embodiment, EDSs are assigned a risk score from 1 to 5 in step 814, with 1 being the least likely to experience a default event and 5 being the most likely. An Equity Default Swap score may be retrieved in step 814 by prompting a user or by accessing data stored on the system or elsewhere. An equity default swap score may be retrieved from a saved workspace, as the result of a calculation, or may be looked up from a data store. In one embodiment, these risk scores may be based on the credit rating of the firm in question, the historical volatility of the equity, the firm's market capitalization, the historical return of this equity and the general level of the equity market measured by the current value of an index, such as the S&P 500, compared with the highest value of the previous ten years. Some of this data, such as the triggering price barrier, may be based on user input. Other data, such as an underlying stock price, may be available from a computer storage medium, such as a Standard & Poor's database. Examples of data relevant to an equity default swap are illustrated in FIG. 5.

With one embodiment, an equity default swap score, such as Standard & Poor's risk scores, may be used to simulate the default time of the asset. In this situation, the simulated default time may be represented as the probability of default during the life of the contract. One approach is to map an equity default swap score to an equity default swap default curve, i.e., the cumulative probability of the equity default swap contract breaching the price barrier. If the price barrier is entered as a price in step 816, the current price of the stock may be needed to determine if the expected percentage loss will bring the price below the price barrier. If the price barrier is input as a percentage, then the current stock price may be needed to calculate a recovery. For example, consider an equity default swap with a price barrier of 30%, and a fixed recovery of 10%. If simulating the default time determines that there is a high likelihood that this equity default swap will trigger, then one embodiment of this invention may need to calculate a fixed recovery. The fixed recovery would be 10% of the current value, i.e., the stock price. Receiving additional data, such as a stock price, in step 818 may also be useful to determine whether or not a default has occurred or to calculate a recovery.

Once all of the forward and present start dates have been set, the default time of each asset is simulated in step 820. Then, the system determines whether or not the asset is modeled with a variable recovery in step 822. If not, the system calculates fixed recoveries at step 824. Variable recoveries are calculated using a distributed recovery at step 826. The distributed recoveries, such as beta distributed recoveries, and the fixed recoveries are used to estimate joint default probabilities at step 830. This may be done in two steps, first estimating the correlations within and between industry sectors in step 828, and then, using these correlations to estimate joint default probabilities between assets in step 830. The results are inspected for convergence in step 832. If the simulations have not converged, then the process returns to re-simulate the default time of each asset based on the revised correlations in step 820. Once the simulation converges to an acceptable degree, the method proceeds towards determining a scenario default rate. First, the system determines if there is a short position in step 834, and, if there is a short position, the risk to the counterparty is modeled in step 836. The system then determines if the portfolio holds an $n^{th}$ to default basket in step 838, and adjustments are made in step 840 to show a default if at least n assets in the basket have defaulted. If the system determines that a tranche is being modeled in step 842, the default rate, or loss rate, is determined for the tranche in step 844 instead of for an entire portfolio as in step 846. Finally, results are reported to a user in step 848.

There are a number of ways to simulate the default time for an asset in step 820. One embodiment of the invention assumes that the transition or default probabilities, recoveries and asset value correlations of all assets in the portfolio are exogenous variables, driven by either firm-specific or systemic effects. These parameters may be estimated from market data for each firm, or preferably, from historical data. For example, given a portfolio of rated firms, the software may access Standard & Poor's global CreditPro® database of rating transitions and defaults since 1981. The CreditPro® database is available by subscription and is updated annually. One method is to assume that the Standard & Poor's rating for the firm is a good proxy for the likelihood of the firm defaulting over a given horizon. It is important that this analysis be performed on a portfolio of firms, because the Standard & Poor's ratings are not absolute measures, but rather ordinal measures of creditworthiness. Therefore, it may be difficult to accurately link a single rating to a default probability.

Another approach is to assume that the default behavior of a firm may be determined from knowledge of the firm's assets and liabilities. In this approach, the asset value of the firm is assumed to follow a geometric Brownian motion characterized by asset volatility. Default of the firm occurs when the asset value falls below a certain threshold, where the threshold is often related to the liabilities of the firm.

A third approach is to focus on the instantaneous default probability, also known as the "hazard rate" or "default intensity," which is determined by a stochastic process.

In another approach, credit curves are used to simulate the default time of an asset. Credit curves may be estimated in two stages. The first stage is the estimation of the probabilities of transitions between different ratings, which may be treated as a transition matrix. With a traditional transition matrix for a one year period, current creditworthiness ratings are displayed across the top. Creditworthiness ratings one year in the future are displayed along the side. The numbers in the matrix are the probability that a firm in that current creditworthiness column will in one year have the future creditworthiness matching its row. For example, using a transition matrix available from Standard & Poor's, there could be a 0.08% probability that an AA+ rated firm will have a BBB+ rating in one year. The second stage is the repeated application of a transition matrix to determine credit curves.

There are two points to consider with this statistical approach. First, generally, there is a paucity of historical default data, especially for highly rated firms and long time horizons, so that estimating cumulative default probabilities directly from the data, even if only default probabilities are required, may give unpredictable results. Second, ratings transitions are assumed to follow a Markov process, in which transition probabilities are constant over time, and do not depend on the previous rating on the firm, e.g., whether the firm was recently upgraded or downgraded. One advantage to this approach is that it serves as a useful starting point for estimation purposes. Additionally, the computer storage requirements may grow exponentially with each previous rating that is considered. Use of a sparse matrix may ease the need for storage.

The "cohort" approach to estimating a discrete transition matrix from empirical data involves observing the transition of cohorts of firms with the same initial rating, or series of ratings in an embodiment that considers a firm's rating history. The total number of firms in class k at time t can be denoted by $n_k(t)$. The total number of observed transitions from class k at time t to class l at time T can be denoted as $n_{kl}(t,T)$. Assuming that rating transitions follow a Markov process, the maximum-likelihood estimator of the corresponding transition probability, $\hat{q}_{kl}(t,T)$ is $$\hat{q}_{kl}(t, T) = \frac{n_{kl}(t, T)}{n_k(t)}, \text{ for all } k \neq l.$$

Denoting the average annual transition matrix by $\overline{Q}$, a T-period matrix $\overline{Q}(T)$ is obtained under the Markov assumption using $\overline{Q}(T) = \overline{Q}^T$ Credit curves can be directly extracted from this matrix.

An alternative to the "cohort" method is the "duration" method, which takes into consideration the exact points in time at which rating transitions take place, using the instantaneous probability of transition, the transition intensity. Transition intensities may be directly estimated via the generator matrix $\hat{\Lambda}$ of the (time-homogenous) Markov chain. The off-diagonal transition intensities $\hat{\lambda}_{kl}$ are given by:

$$\hat{\lambda}_{kl}(t, T) = \frac{m_{kl}(t, T)}{\int^T n_k(s)ds}, \text{ for all } k \neq l,$$

where $m_{kl}(t,T)$ is the total number of transitions from class k to class l (again, k≠l) over the interval [t,T]. The denominator in the above equation is the total time, in firm-years, that firms spend in each rating class k over the whole sample period. A T-year transition matrix is then calculated from the generator matrix using $$\lambda_{ll} = -\sum_{k \neq l} \lambda_{kl}$$

for the diagonal elements and, for the off diagonal elements, $$\overline{Q}(T) = \exp\{T \cdot \hat{\Lambda}\}.$$

A single one year transition matrix can be derived by comparing the results of the two approaches, the cohort approach and the duration approach. In some embodiments, other qualitative adjustments may be made, such as for certain "ratings momentum" effects. One reason to make a qualitative adjustment is to provide better agreement with average long term historical default behavior of rated firms.

A one year transition matrix may be used to determine long term credit curves for each rating category. One approach is to raise the matrix to a higher power and extract the default column of each N-year matrix (e.g., N=1 to 30).

With respect to asset backed securities, one conservative approach is to use corporate default rates as proxies for the long term behavior of asset backed securities. In the future, more default data on asset backed securities may be available. Given enough data on defaults of asset backed securities, one may use an approach similar to the ones described above. For example, the default rates of asset backed securities may be determined using a transition matrix that is based on the average historical asset backed security transition matrix. In one embodiment, qualitative adjustments may be made to create long term asset backed security default rates, for maturities between five and seven years, that are 55% and 75% of the corresponding default rates for firms rated at investment grade and non-investment grade and non-investment grade respectively. This embodiment caps the model at seven years to save computational resources, such as storage space. Generally, if an asset backed security is not expected to default for at least seven years, the likelihood that it will default after the seventh year is negligible.

Where data on sovereign securities is relatively sparse in comparison with rated firms, one approach is to use credit curves for rated firms as conservative proxies. When data on sovereign securities is plentiful, one of the above approaches may be preferable.

The ratings for small to midsized enterprises, e.g. AAA and BB, may be determined differently than the credit ratings for large enterprises. This has the advantage of allowing a user to read a credit rating and have a general sense of whether or not a firm is a good credit risk, but it may prevent useful direct comparisons between different types of entities with the same rating. One approach is to create "rating estimates," such as those released by Standard & Poor's, based on both one year default probabilities and annualized default probabilities. For example, given two small enterprises with low one year default probabilities but very different volatilities, the enterprise with the lower volatility is likely to be assigned a higher credit rating.

After simulating the default time of each asset in step 820, the system calculates a recovery for each asset. Some assets are modeled using a fixed recovery assumption in step 824, such as 30% of the purchase price on default. Other assets (generally with sufficient historical data) are modeled using a variable recovery assumption in step 826. If the default occurs before the maturity of the collateralized debt obligation transaction, an asset specific recovery may be computed as well. Though not illustrated, a user may input a request to compute a complete distribution of all losses in the portfolio, which may require the user to input exposures for each asset in the portfolio, or used an assumed value.

In general, the level of recovery achieved following a default is uncertain, or stochastic. For a debt instrument, such as a bond or loan, recovery depends on a number of factors, for instance the seniority of the instrument and the economic environment in which the default occurred. However, in the context of synthetic collateralized debt obligations recovery can be determined in different ways, including the specification of a fixed level that does not depend on these factors. One approach to model the different types of recovery mechanisms included in collateralized debt obligations is to treat recoveries in two ways—fixed and variable. Such an approach will divide simulated default times based on whether or not an asset is modeled as a variable recovery.

Although recoveries are usually uncertain, there are two main reasons for using fixed recovery assumptions for certain assets. The first is that recovery can in certain transactions be set at a fixed percentage of the amount at risk, e.g., 50%, as is often used in equity default swaps. The second is that historical data is not always sufficient to allow precise determination of the degree of variability in recoveries. For this reason, a fixed recovery that incorporates some degree of conservatism can be used to save computational resources whereas a more complicated analysis may not provide enough added accuracy to justify the extra hardware and software.

According to the embodiment illustrated in FIG. 8, once an asset has been determined to have a variable recovery in step 822, the method calculates a variable recovery in step 826. As previously mentioned, it is preferred to use a beta distributed recovery for each asset with a variable recovery. In some cases, sufficient historical data exists to allow the degree of variability in recoveries to be explicitly modeled. For example, Standard & Poor's LossStats® database contains recovery information for more than 500 non-financial public and private U.S. companies that have defaulted since 1988. It contains information on more than 2,000 defaulted bank loans and high-yield bonds, and other debt instruments. This extensive data allows the system to create recovery distributions for certain types of assets, based on a beta distribution, which is a two-parameter distribution. With one embodiment, specification of the mean and standard deviation of the beta distribution is sufficient to simulate a large range of potential recoveries for each type of asset.

In addition to modeling the individual default and recovery of each asset, a univariate calculation, this embodiment may further model the dependency between defaults of different assets, a subprocess comprising estimating correlations within and between industry sectors (step 828) and estimating joint default probabilities between assets (step 830). By way of illustration, a user may be interested in determining the default probability of a yo-yo maker. One approach would be to model the default probability of the yo-yo maker by itself by considering its assets, such as annual revenue, inventory and intellectual property and comparing these with its liabilities, such as rent and employee wages. One could assume that the assets will grow in a geometric Brownian manner, and then model when the assets are likely or possibly less than the liabilities. However, this approach may not be able to consider dependencies. A different approach could include the historical defaults of other toy manufacturers. It would seem relevant to know that firms in a positively correlated industry, e.g. hula hoops or other yo-yo manufacturers, are suffering a large number of defaults. Similarly, a model that considers dependencies may be able to factor in that a negatively correlated industry, e.g. video games, is seeing a small number of defaults.

In step 830 of the method illustrated in FIG. 8, the invention estimates joint default probabilities between assets. In a preferred embodiment, the invention uses a Gaussian copula model as its dependency model. A copula is a multivariate cumulative distribution function defined on the n-dimensional unit cube $[0, 1]^n$ such that every marginal distribution is uniform on the interval $[0, 1]$. The copula contains all of the information on the nature of the dependence between a set of random variables that can be given without the marginal distributions, but gives no information on the marginal distributions. In effect, the information on the marginals and the information on the dependence are neatly separated from each other. The Gaussian copula is constructed from a bivariate normal distribution using Sklar's theorem.

With a Gaussian copula dependency model, the $i^{th}$ asset may be assumed to have a term structure of survival probabilities $S^i(t)$. The survival probabilities can be obtained from the cumulative default probabilities for each asset, sometimes referred to as credit curves. Generally, a credit curve will be represented as either a mathematical function or as a look up table of values. For clarity, credit curves are sometimes depicted on Cartesian coordinate systems. Initially, all firms are solvent, otherwise there would be little value to the credit curve. Generally, credit curves decrease monotonically, and the rate at which they decrease is a function of the creditworthiness of the underlying asset. One approach to obtain a simulated default time is to select a desired default probability along the y-axis and trace over to see where the curve crosses this parallel. The x coordinate of this point is the future time at which the default has the desired probability. For example, according to a Standard & Poor's credit curve, a BBB rated asset has a 0.03% probability of defaulting in 5.5 years Dependency is introduced to the credit curves via the Gaussian copula function $$C(u_1, \ldots, u_N) = \Phi_\Sigma(y_1, \ldots, y_N),$$

where Σ denotes the correlation matrix, Φ represents the univariate standard normal cumulative distribution function, and, followingly, $\Phi_\Sigma$ is the multivariate standard cumulative distribution function with correlation matrix Σ. The copula function therefore links together the standard normal variables, also referred to as latent variables, $y_i$ to create a multivariate distribution of uniform random variables $u_j$.

Correlated default times may be simulated in a four step process. If a process has not yet estimated correlations within and between industry sectors, then default correlations may be used. First, the software simulates a vector of N standard normal variables $y_i$ for each asset. Standard normal random numbers may be computed using the Mersenne Twister algorithm. Second, a given correlation matrix Σ is imposed on the vector using Cholesky factorization. Third, the software calculates $u_i=\Phi(y_i)$. Fourth, the software calculates a default time $\tau_i=S^{-1}(u_i)$ for each asset. $S^{-1}$ denotes the quasi-inverse of the survival function.

If $\tau_i$ is less than the maturity T of the collateralized debt obligation transaction, the loss $L_i$ is determined as $L_i=E_i\times(1-\delta_i)$, where $E_i$ is the exposure at default for the $i^{th}$ asset and $\delta_i$ is the exposure at recovery for the $i^{th}$ asset.

At a given time t, the loss of the portfolio L(t) can be described as $$L(t) = \sum_i E_i \times (1-\delta_i) \times 1_{\{\tau_1 \le t\}},$$

where the subscript $\{\tau_i \le t\}$ operates to zero out the loss for a given asset is the time to default is greater than the length of the collateralized debt obligation transaction, and thus $1_{\{\tau_1 \le t\}}$ is the default indicator for the $i^{th}$ asset, i.e. it is one or zero depending on the truth of the subscript function.

Given the fixed and distributed recoveries for a portfolio, the invention may proceed to estimate correlations within and between industries in step 828 and then use these probabilities to estimate joint default probabilities between assets in step 830. One approach is to specify correlation betweens pairs of assets in addition to the univariate default probabilities and recovery assumptions for a given asset. As per above, this may be assumed to be the asset value correlation, which is not directly observable in most markets. One approach is to use regression analysis of equity returns within a factor model. Another approach is to use equity return correlations as proxies for asset value correlation. A further approach is to use credit spread correlations as proxies for asset value. Yet another approach is to infer asset value correlations from rating migrations. A different approach is to estimate asset value correlations from empirical default observations. Where credit spread data provides a limited time period, using empirical default observations provides an advantage of being less prone to "noise" within equity return data. Creating estimates from empirical default models may be applied to corporate bonds, asset backed securities, small to mid-sized enterprises and equity default swaps.

One way to ensure good stability is to consider several statistical techniques. These techniques may range from maximum likelihood methods and factor models to simpler methods based on empirical joint default events. This latter approach is frequently referred to as a joint default probability approach.

The joint default probability between assets may be estimated in two stages. The first is to estimate the joint default probability $P_{ij}(t)$ between pairs of companies, either in the same industry or in different industries 828. If pairs of companies are drawn (with replacement) from a database of companies, an estimate of the joint probability of default within an industry is given by $$P_{ij}^c(t) = \frac{(D_t^c)^2}{(N_t^c)^2},$$

and between industries by $$P_{ij}^{cd}(t) = \frac{D_t^c D_t^d}{N_t^c N_t^d}.$$

In these expressions, $D_t^c$, $D_t^d$ and $N_t^c$, $N_t^d$ are the number of defaulted companies and total number of companies in industries c and d, respectively, observed over a time period t. The empirical default correlation $\rho^{cd}$ may be determined with the standard correlation equation:

$$\rho^{cd} = \frac{\overline{P}^{cd} - \overline{P}^c \overline{P}^d}{\sqrt{\overline{P}^c(1-\overline{P}^c)}\sqrt{\overline{P}^d(1-\overline{P}^d)}}.$$

In this formula, $\overline{P}^k$ denotes the average default probability of companies in industry k. Performing these calculations can produce non-zero inter-sector correlations, especially if the industries chosen are different sectors, and have different average default probabilities.

The second stage of estimating the joint default probability between assets is calculating the implied asset correlation from the joint default probabilities 830. This may be done using the Gaussian copula model described above, by calculating the asset correlation required to recover the empirically observed joint default probabilities. For two companies, the joint default probability $P_{ij}$ may be given within the model by $$P_{ij}=\Phi(Z_i,Z_j,\rho_{ij}),$$

where $Z_i=\Phi^{-1}(P_i)$ and $Z_j=\Phi^{-1}(P_j)$ are "z-scores" indicating the default threshold for each company. This means that one way to determine the implied asset correlation $\rho_{ij}$ is to solve $$\rho_{ij}=\Phi^{-1}(Z_i,Z_j,P_{ij}).$$

One approach is to estimate correlations within and between different industry sectors. The average intra-industry and inter-industry correlations across entire datasets may then be used to create the correlation assumptions. Employing non-zero inter-sector correlations may allow a model to accurately reflect how defaults in a first industry affect defaults in a second industry.

One way to determine convergence in step 832 is to recalculate default times based on the estimated dependencies and correlations. As more simulations are run, it is generally expected that the predicted and calculated default times should become closer together, or the predicted and calculated joint default probabilities become closer together. If the difference between two or more calculations, possibly from sequential iterations, is acceptable, then the software may proceed to the next step, e.g. to determine if there is a short position in the portfolio.

In the preferred embodiment, the user may specify a number of iterations that will be deemed convergence. A user may type in a number of iterations, e.g., 100,000, and then once the requested number of iterations have been run, the system 100 will assume that the data are sufficiently converged (of course, the user may also request further iterations).

The distribution of portfolio losses can be determined to a high level of accuracy by using Monte Carlo simulation to generate a sufficient number of default times to achieve satisfactory convergence. In one embodiment, whether or not a convergence is satisfactory depends on the shape of the credit curves and the degree of asset correlation. For example, highly rated assets will rarely generate low default times, requiring a large number of simulation trials to generate a statistically significant number of default events before maturity. For most portfolios, 500,000 simulation trials are sufficient to obtain satisfactory convergence.

For a collateralized debt obligation linked to a single portfolio of assets, the portfolio loss distribution contains all of the information required to determine the performance of each collateralized debt obligation tranche. When a synthetic collateralized debt obligation references other synthetic collateralized debt obligations, one approach is to "drill-down" by simulating the default times of each asset underlying each collateralized debt obligation. In this way, each underlying synthetic collateralized debt obligation may be evaluated as illustrated in FIG. 8. The process may then be repeated for the parent synthetic collateralized debt obligation by using the default scenario calculations for each underlying synthetic collateralized debt obligation in place of default simulations for particular assets.

One way to determine if a portfolio contains a short position in step 834 is to inspect the metadata for each asset in the portfolio, and determine if any are designated as a short position. Once a short position has been detected in step 834, the invention models counterparty risk in step 836. Modeling counterparty risk can be used to calculate a short position gain. In one embodiment of the invention, the computerized system 100 may receive user input to describe a counterparty, such as a financial guarantor or a credit default swap counterparty. The computerized system 100 may receive five data fields from the user. The first is the Counterparty ID, a unique name to identify a counterparty. This field may correspond to the Obligor ID if the counterparty is also the obligor referenced. The second field is the Asset Type and the third field is a credit rating for the asset, such as the Standard & Poor's Credit rating. The fourth field, Country Code, specifies the counterparty's country of origin. The fifth field is the Sovereign Foreign Currency Rating, which is a foreign currency solvency rating (such as the Standard & Poor's foreign currency solvency rating) for the asset's country of origin. Given this additional data, the invention may model the counterparty risk just as it models the risk of assets and portfolios. If there is a two party transaction, as most transactions are currently, then the counterparty risk is equal to the opposite of the short term gain. This is because a two party transaction, such as this one, is a zero sum equation, and thus the loss of one party is the gain of the other.

Step 836 may include determining a short position gain. The short position gain may be calculated in four sub-steps. First, determine that the short position condition was met, for example, the reference name in a credit default swap defaulted. Second, condition recovery upon the survival of the protection seller for default swaps. Third, if these conditions are met, set the short position gain to be the reference notional amount of the contract minus a recovery amount in the event of a default of a reference entity on or more of its obligations. In one embodiment, this may be modeled by reversing the polarity of the loss, because the loss corresponding to the protection seller has the same absolute value as the gain to the protection buyer. In another embodiment, a CDO squared may receive protection on an underlying CDO tranche. For example, a CDO squared may be entitled to a protection payment if the losses of the CDO tranche exceed the attachment point of the underlying CDO tranche. This difference may equal the difference between the net portfolio loss and the tranche attachment point, up to a maximum size of the underlying CDO tranche. A gain, such as from a short position, can be included in a scenario loss rate.

In one embodiment, a portfolio may have metadata specifying that it contains an $n^{th}$ to default basket. If an $n^{th}$ to default basket is detected in step 838, the invention calculates the recovery for the basket in step 840. One way to model an $n^{th}$ to default basket is treating it as a synthetic CDO with a small number of equal exposures, typically three to five. The mechanics are similar to a credit default swap, though the reference entity is replaced with a basket of reference entities, and the protection seller is exposed to the risk of the $n^{th}$ default within the basket. If an $n^{th}$ to default basket has a fixed recovery $\delta$, then it may be treated as a synthetic CDO with an attachment point of $(n-1)\delta$, because the basket has equal exposure to each default.

If a tranche is detected in step 842, the invention proceeds to step 844 in which the risk exposure of collateralized debt obligation tranches in different collateralized debt obligation transactions is analyzed. In addition to the steps discussed in depth, cash collateralized debt obligations, as opposed to synthetic collateralized debt obligations, may benefit from modeling the impact of interest rate and currency risk on the interest payments made to each collateralized debt obligation tranche.

A primary risk measure used to analyze collateralized debt obligation transactions is the scenario loss rate, which is a quantile of the portfolio loss distribution consistent with a given rating and maturity. For example, if the rating quantile of the portfolio loss distribution corresponding to a certain rating and maturity is 0.5%, the required percentile of the loss distribution is 99.5%. In one embodiment, the rating quantiles are specific to CDO ratings tranches, and thus may not be identical to corporate credit curves. In another embodiment, the ratings quantiles may be identical to corporate credit curves. Where there is much less historical performance data for CDOs than for the underlying corporates, one approach is to not determine the CDO rating quantiles purely from historical data.

For a synthetic CDO, the scenario loss rate may be modeled in step 844 as the attachment point, or credit enhancement, required for a tranche with the relevant rating and maturity. For cash CDOs, the credit enhancement may be determined through a cash flow modeling exercise, in which the default times of the asset portfolio are combine with interest rates and currency exchanges rates, as desired, to determine the overall credit performance of each rated CDO tranche.

The scenario default rate is determined differently for a tranche than for a portfolio as in step 846, because a tranche is only susceptible to losses between its attachment and detachment points. If there is no tranche, then the invention proceeds to calculate the scenario default rate, in a first manner in step 846. If there is a tranche, the invention may determine how much of the loss is between the attachment and detachment points of the tranche in step 844. Given an attachment point A and detachment point D (i.e., a tranche thickness equal to D−A), the tranche default probability, denoted $PD^{Tranche}$, is the probability that portfolio losses at maturity T exceed A. This is given by $PD^{Tranche} = P(L(T) \geq A) = E[1_{\{L(t) \geq A\}}]$, where $L(t)$ is the portfolio loss up to time t, $1_{\{\}}$ is the indicator function and E[ ] denotes the expectation. This forms the basis for assigning a rating to a synthetic CDO tranche. The above equation assumes that the attachment point A is constant over time. This can be generalized to cases where the attachment point is a function of time t, so that the above equation becomes $$PD^{Tranche}=P(L(T)\geq A(t))=E[1_{\{L(t)\geq A(t)\}}].$$

In this case, the loss distribution may be evaluated at all points in time at which the attachment point changes. As an example, consider a hypothetical seven year synthetic CDO transaction. If the attachment point is initially set at 3% of the portfolio notional balance, but then increases to 5% after three years and remains at 5% until maturity, the loss distribution may be evaluated at years three and seven. The cumulative default probability of the tranche is therefore the probability that losses exceed 3% by year three, plus the probability that losses exceed 5% by year seven, conditional upon losses not exceeding 3% by year three.

Additionally, the time dependency of the attachment point can be made conditional upon levels of loss being reached within the portfolio. For example, it is possible to model transactions in which the attachment point "resets" according to the cumulative loss experienced by the portfolio by a certain date. This dynamic behavior may be modeled by keeping track of the portfolio loss paths during simulation. The cumulative loss on the tranche at time t is denoted M(t), is given by $$M(t)=(L(t)-A)1_{\{A\leq L(t)\leq D\}}+(D-A)1_{\{L(t)\geq D\}}.$$

The expected tranche loss is therefore given by $$E[M(t)]=E[(L(t)-A)1_{\{A\leq L(t)\leq D\}}+(D-A)1_{\{L(t)\geq D\}}].$$

The tranche loss given default calculation in step 844 determines, for the instances in which there is a default, how much loss is expected. It is given by $$LGD^{Tranche}=\frac{E(M(t))}{PD^{Tranche}}.$$

In one embodiment, a user may select that a loss given default be computed as part of determining a tranche scenario default rate in step 844 or as part of determining a portfolio scenario default rate in step 846. The loss given default is the percentage of the exposure at default which will not be recovered following a default. As exemplified above, one way to calculate a loss given default is to divide the total losses by the exposure at default. Another way is to divide the total losses by the unsecured portion of a credit line. One advantage of this second approach is to allow a user to divide their losses between losses on unsecured portions and losses on secured portions due to depreciation of collateral quality. Note that the loss given default is not assumed to be time invariant.

The last step of the flowchart illustrated in FIG. 8 is reporting results to the user. The results may be displayed on a display device 112, such as a computer screen or a printout. Exemplary types of results may include: probabilities, percentages, gains, losses, charts, graphs, and other representations. The key statistics spreadsheet illustrated in FIG. 7 is one way to report results to a user in step 848.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

The invention claimed is:

1. A computerized method for evaluating collateralized debt obligations, comprising:
   using a computerized system having a processor and a computer storage medium to receive a user input selection of a scenario from a list of scenarios including at least one of:
   a short position scenario,
   an $n^{th}$ to default basket scenario, and
   a forward start date scenario;
   using the computerized system to load data related to a portfolio of securitized assets on to the computer storage medium;
   using the computerized system to model the at least one user selected scenario based on the user input selection and at least one of the assets in the portfolio;
   using the computerized system to determine a scenario default rate based on the scenario modeled; and
   using the computerized system to report a result relating to the scenario default rate to the user.

2. The method of claim 1, wherein the receiving the user input selection includes displaying only those data fields that are relevant to the one or more selected scenarios.

3. The method of claim 1, wherein reporting includes displaying a graph of simulation convergence.

4. The method of claim 1, wherein reporting includes displaying a loss given default.

5. The method of claim 1, wherein reporting includes displaying a monetary loss.

6. The method of claim 1, wherein modeling an $n^{th}$ to default basket includes modeling a synthetic collateralized debt obligation with no more than five equal exposures.

7. The method of claim 1, wherein determining a scenario default rate includes computing losses between an attachment point and a detachment point.

8. The method of claim 1, wherein determining a scenario default rate includes using the creditworthiness of a first asset as a proxy for the creditworthiness of a second asset.

9. The method of claim 1, further comprising using the computerized system to calculate one of a fixed recovery and a variable recovery for each asset.

10. The method of claim 9, wherein calculating a variable recovery includes calculating a beta distributed recovery.

11. The method of claim 1, wherein the user input selection of a scenario is a selection of a portfolio of securitized assets including a first collateralized debt obligation that references a second collateralized debt obligation.

12. The method of claim 1, wherein determining a scenario default rate includes performing a Monte Carlo simulation.

13. The method of claim 1, wherein determining a scenario default rate includes computing a Gaussian copula.

14. The method of claim 1, wherein the user input selection of a scenario is a selection of a portfolio of securitized assets including a synthetic collateralized debt obligation transaction.

15. The method of claim 1, wherein the user input selection of a scenario is a selection of a portfolio of securitized assets including a tranche of an asset.

16. The method of claim 1, wherein the processor includes a processor configured to perform modeling and a processor configured to determine a scenario default rate.

17. A computerized system for evaluating collateralized debt obligations, comprising:
   a processor;
   a computer storage medium coupled to said processor and storing a set of machine readable instructions that are executable by said processor;

a display device coupled to said processor;
a user input device coupled to said processor;
wherein said processor and said computer storage medium are configured to:
    receive a scenario selection from said user input device;
    load data related to a portfolio of securitized assets into a workspace;
    model at least one of: a short position scenario, an $n^{th}$ to default basket scenario, or a forward start date scenario, based on said user input and at least one of said assets in said portfolio;
    determine a scenario default rate based on said scenario modeled; and
    cause the display device to report a result relating to said scenario default rate to said user.

18. The system of claim 17, wherein said processor and said computer storage medium are configured to cause the display device to:
    prompt a user to select one or more scenarios from a list of a plurality of scenarios; and
    display only those data fields that are relevant to said one or more selected scenarios.

19. The system of claim 17, wherein the reporting the result relating to said scenario default rate includes displaying a graph of simulation convergence.

20. The system of claim 17, wherein the reporting the result relating to said scenario default rate includes displaying a loss given default.

21. The system of claim 17, wherein the reporting the result relating to said scenario default rate includes displaying a monetary loss.

22. The system of claim 17, wherein the model an $n^{th}$ to default basket includes model a synthetic collateralized debt obligation with no more than five equal exposures.

23. The system of claim 17, wherein determining a scenario default rate includes computing losses between an attachment point and a detachment point.

24. The system of claim 17, wherein determining a scenario default rate includes using a creditworthiness of a first asset as a proxy for a creditworthiness of a second asset.

25. The system of claim 17, wherein said processor and said computer storage medium are configured to calculate one of a fixed recovery and a variable recovery for each asset.

26. The system of claim 25, wherein the calculating a variable recovery includes calculating a beta distributed recovery.

27. The system of claim 17, wherein the received scenario selection is a selection of a portfolio of securitized assets including a first collateralized debt obligation that references a second collateralized debt obligation.

28. The system of claim 17, wherein determining a scenario default rate includes instructions to perform a Monte Carlo simulation.

29. The system of claim 17, wherein determining a scenario default rate includes instructions to compute a Gaussian copula.

30. The system of claim 17, wherein the received scenario selection is a selection of a portfolio of securitized assets including a synthetic collateralized debt obligation transaction.

31. The system of claim 17, wherein the received scenario selection is a selection of a portfolio of securitized assets including a tranche of an asset.

* * * * *